(12) United States Patent
Ball

(10) Patent No.: US 7,175,194 B2
(45) Date of Patent: Feb. 13, 2007

(54) ANTI-JACKKNIFE SYSTEM

(75) Inventor: Michael Ball, Vista, CA (US)

(73) Assignee: Impact Engineering Technologies, Inc, Vista, CA (US)

( * ) Notice: Subject to any disclaimer, the term of this patent is extended or adjusted under 35 U.S.C. 154(b) by 251 days.

(21) Appl. No.: 10/959,390

(22) Filed: Oct. 6, 2004

(65) Prior Publication Data

US 2006/0071446 A1 Apr. 6, 2006

(51) Int. Cl.
*B60T 7/12* (2006.01)
(52) U.S. Cl. .................................. 280/432; 280/455.1
(58) Field of Classification Search ................ 280/432, 280/433, 446.1, 455.1
See application file for complete search history.

(56) References Cited

U.S. PATENT DOCUMENTS

| | | | |
|---|---|---|---|
| 2,073,269 A | 3/1937 | Skibbe | |
| 2,130,004 A | 9/1938 | Fusetti et al. | |
| 2,723,865 A | 11/1955 | Leoni | |
| 2,772,894 A | 12/1956 | Oats | |
| 3,031,205 A | 4/1962 | Fox | |
| 3,302,957 A | 2/1967 | Allen et al. | |
| 3,633,940 A | 1/1972 | Sinnard | |
| 3,722,919 A | 3/1973 | Herbert | |
| 3,730,555 A | 5/1973 | Keller | |
| 3,774,941 A | 11/1973 | Durr | |
| 3,857,586 A | 12/1974 | Mascuch | |
| 3,963,265 A | 6/1976 | Kornoelje et al. | |
| 4,068,860 A | 1/1978 | Meyers et al. | |
| 4,204,700 A * | 5/1980 | Haines, Sr. ................ | 280/432 |
| 4,300,785 A | 11/1981 | Mettetal | |
| 4,438,943 A * | 3/1984 | Hebert ....................... | 280/432 |
| 4,583,756 A | 4/1986 | Hornung et al. | |
| 4,585,248 A | 4/1986 | Miller et al. | |
| 4,700,966 A | 10/1987 | Hawkins et al. | |
| 4,934,727 A | 6/1990 | Hawkins et al. | |
| 4,991,863 A | 2/1991 | Hosmer | |
| 5,135,248 A | 8/1992 | Keiserman | |
| 5,232,239 A | 8/1993 | Hawkins et al. | |
| 5,456,483 A | 10/1995 | Madsen et al. | |
| 5,730,454 A | 3/1998 | Dudzik et al. | |
| 6,260,872 B1 | 7/2001 | Budhram | |
| 6,340,167 B1 | 1/2002 | Boyd | |
| 6,422,584 B1 | 7/2002 | Bittroff et al. | |
| 6,565,108 B1 | 5/2003 | Gearhart | |

* cited by examiner

*Primary Examiner*—Tony Winner
(74) *Attorney, Agent, or Firm*—Donn K. Harms

(57) ABSTRACT

An anti-jackknifing device adapted for engagement between a tractor having a fifth wheel engaged with a trailer. The device features a pair of catch arms rotationally engaged to a mount with the tractor. The distal ends of the catch arms move between an engaged position in a horizontal path between two trailer mounted engaging components adapted to engage the distal end and a disengaged position out of the path. The distal ends of the catch arms may be pivotally mounted. The distal ends of the catch arms and the engaging components may also be shaped to cooperatively engage on contact. A control causes the catch arms to rotate thereby engaging the distal ends of the arms between the engaging components either automatically above a threshold speed or manually. This engagement limits the angle of the trailer to the tractor to a predetermined angle when trailer rotates on the fifth wheel causing the engaging components to contact the distal ends of the catch arms.

24 Claims, 5 Drawing Sheets

ANTI-JACKKNIFE SYSTEM

BACKGROUND OF THE INVENTION

1. Field of the Invention

The present invention relates to safety devices for fifth wheel vehicles such as tractor trucks that pull trailers. More particularly the device and embodiments thereof shown herein relate to a device to combat the ever present danger of jackknifing suffered by tractor and trailer combinations on the highway.

2. Prior Art

Traffic related accidents involving tractors engaged in the towing of trailers cost the trucking industry over $60 billion dollars annually. A significant factor leading to accidents which contribute to such a huge cost is caused by the inherent weakness of the conventional attachment of trailer-pulling vehicles to their rear-mounted trailers.

Because of the long length of the trailers involved and the need to continually negotiate highways, streets and loading docks, a pivoted mount of the trailer to the tractor is a necessity. However, the flexibility provided by a pivoted attachment to the trailer has a down side, especially when the wheels on the front vehicle or trailer lose traction. When the tires lose their grip, the relative alignment between the center axis of the front vehicle and that of the towed trailer can rapidly exceed a critical angle, thereby causing a jackknife condition.

From the dawn of development of motorized vehicles engaged in pulling trailers at significant speeds, many anti-jackknife devices have been described and taught. These devices can be classified into two broad categories. In the first category, a braking apparatus is adapted to engage with the mounting engagement of the tractor to the trailer, more commonly known as a fifth wheel. Most such braking style devices employ a conventional disc or drum brake mechanism that controls the angle and speed at which the trailer will rotate in its engagement to the tractor by slowing the rotation of the fifth wheel engaged to the trailer. This type of design can also be employed to provide a dampening force that controls the rate of rotation.

The second broad category of anti-jackknife devices includes devices designed to mechanically limit the maximum articulation of the trailer in relation to the tractor. This is generally accomplished by cutting slots, installing cables, or mounting hard stops to limit the trailer from articulating past a certain maximum angle. Because there are many times such as backing up or turning sharp corners where such an angle-limiting device would cause a problem, an activation mechanism that interfaces with the limiting devices must be included to disengage them and thereby allow the trailer to rotate more than about 20 degrees during slow speed maneuvers.

One widely used example of the slot style of articulation limitation employs hydraulic or pneumatic actuating pins, usually mounted on the fifth wheel, which are inserted into an arcuate slot cut into the bottom of the trailer. One major disadvantage of this design is that it is impossible to install a sufficiently large pin and corresponding actuating cylinder without redesigning the conventional kingpin latching mechanism on the more popular fifth wheels. Because it would be prohibitively expensive to replace all of the fifth wheels in a medium to large fleet in addition to purchasing the anti-jackknife device, this type of articulation limiting component is used sparingly. Another concern limiting the deployment of this type of system is the resulting reduction in strength caused by cutting large mounting holes in the fifth wheel and long slots in the bottom plate of the trailer.

Another scheme employed to limit rotational movement uses cables attached to the tractor and trailer. While this can be an effective method of preventing jackknifing, such devices require the driver to attach and detach heavy, dirty cables every time a new trailer is hooked up to the tractor. This is not only a nuisance but is also not a passively employed restraint, and disliking the task, drivers will often neglect to perform it at all, or if inexperienced, they may improperly attach the cables, potentially creating an unsafe condition. Like the pin mechanisms above, these cable devices can be very expensive, especially as a retrofit, since the length of the cables must change to accommodate sharp turns at low speeds which requires a cable winding mechanism. The bulk of such an apparatus to maintain the cables in the desired length must be mounted on the trailer which is not desirable since this greatly increases the cost to the trucking companies. This is because as a general rule most trucking companies have at least twice as many trailers as tractors.

Several patents teach the use of the fifth wheel component itself as a hard stop to restrict the rotational movement of the trailer such as in U.S. Pat. No. 5,135,248 (Keiserman) or U.S. Pat. No. 4,068,860 (Meyers). However, engagement of these types of devices require an extensive support structure mounted on the trailer to support the resulting side stress, increasing the cost.

Another probably more practical anti-jackknife device involves mounting lugs or stop blocks to the bottom of each trailer to be engaged with a tractor. Prior art describes such a scheme wherein the fifth wheel itself, or protruding lugs attached to the fifth wheel, are employed to interfere with the stop blocks mounted on the trailer. These types of devices are mainly used to protect the cab of the tractor from damage at very slow speeds and when turning sharply as would occur when picking up or dropping off the trailer.

U.S. Pat. No. 3,963,265 (Kornoelje) and U.S. Pat. No. 4,991,863 (Hosmer) teach an active mechanism mounted directly on the front of the fifth wheel to engage with blocks mounted on the bottom of the trailer. The actuating mechanism allows for full trailer rotation at lower speeds and jackknife protection above a certain speed threshold. However, Komeolje's design may not easily withstand the forces of the larger tractor-trailers during a jackknife situation and it is incompatible with most of the fifth wheels currently in use. Hosmer depicts a device with substantially more strength than Komeolje, but this strength comes at a cost since it requires substantial modifications to the fifth wheel, or more likely requires a custom fifth wheel altogether. Hosmer's patent also relies on the strength of the actuating cylinder to limit the angle of rotation which requires a cylinder of considerable size and cost.

U.S. Pat. No 3,730,555 (Keller) shows a pivoting "bumper" assembly mounted on the end of the tractor behind the last set of tires. The pivoting mechanism allows the bumper to engage the stop blocks on the trailer when jackknife protection is required. Whereas Keller's patent shows substantial strength, it does not compensate for movement when the tractor is tilted up or down relative to the trailer as would be seen, for instance, at the crest of a hill which could have devastating consequences. Additionally, there is a substantial cost associated with installing the extensive reinforcing members of Keller which is likely to have prevented any significant deployment by cost conscious truckers.

As such, there is an unmet need for an anti-jackknife device for tractor trailer combination vehicles. Such a device should minimize the number of components required to be mounted to the trailer to thereby minimize overall cost. Such an anti-jackknife device can be manual in engagement or would in a preferred form be passive in its engagement and activation such that it is automatically activated above a certain threshold speed and deactivated to allow turning and backing up of the trailer at slower speeds. Such a device should eliminate or minimize the labor of the driver or other workers to employ it, thereby encouraging its use with experienced drivers and not requiring any special instruction for newer drivers. Still further, such an anti-jackknife device should be constructed to transfer the forces developed in anti-jackknife situations to the tractor frame and should be able to work no matter what the angle of the front of the trailer to the rear of the tractor. Additionally, such a device should be easily attached to the vast majority of conventional tractors without the need for any substantial modification to the tractor or fifth wheel mounted upon it.

SUMMARY OF THE INVENTION

The device herein disclosed and described achieves the above-mentioned goals by providing an improved anti-jackknife system for trailers being pulled by tractors in a number of preferred embodiments.

In both embodiments herein described a conventional fifth wheel adapted to engage with a trailer is pivotally attached to a support bracket. The support bracket may be fixed in position or engaged upon a support frame which is laterally translatable on the rear of the tractor to adjust the position of the fifth wheel relative to the front of the tractor.

A pair of catch arms are engaged at one end to an arm bracket which is engaged with the support bracket or may be integrally formed as part of the support bracket. The distal ends of the catch arms, opposite their mount, translate from a disengaged position out of contact with mounts positioned on the bottom of the trailer to an engaged position wherein they cooperatively engage in-between two ends of the mounts positioned on the bottom of the trailer. Mounting of the catch arms to communicate stresses directly to the support bracket imparts any strain on the device to the support frame of the tractor or truck rather than to the fifth wheel when the device is employed to restrain the trailer angle.

Translation of the distal ends of the catch arms can be accomplished by any number of means to translate the distal ends of the catch arms such as a hydraulic or electric means to rotate the catch arms in their mount at the first end in a horizontal translation, or raising the catch arms upward in a vertical translation, or a combination of a vertical and horizontal translation to achieve a concurrent angled incline of the distal ends to their final position engaged with the trailer.

All embodiments of the device operate in a similar manner with the catch arms translating to engage a pair of trailer-mounted catch brackets with distal ends of the catch arms which are adapted for such an engagement. Optionally, a shock absorption means may be communicated to the catch arms to dampen the forces imparted to the tractor by the trailer when it rotates and imparts force to the catch arms engaged with the trailer mounted catch brackets.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

It is an object of this invention to provide an improved anti-jackknife device which can be easily installed on the majority of conventional trailer tractor combinations.

It is another object of this invention to provide an anti-jackknife device that does not require modifying the fifth wheel of the tractor.

Yet another object of this invention is the provision of an anti-jackknife device that does not require cutting slots or other structural weakening apertures into the bottom of the trailer.

A still further object of this invention is to provide an anti-jackknife device which does not require any driver intervention when hooking up to a trailer.

Yet another objection of the herein disclosed invention is the provision of an anti-jackknife device that is passive in its engagement and disengagement at a threshold speed.

An additional object of this invention is to provide an anti-jackknife device for tractor trailer combinations which requires minimal maintenance.

A further object of the disclosed invention herein is to provide an anti-jackknife device which minimizes the size and number of components required to be attached to the trailer to minimize costs.

Further objects of the invention will be brought out in the following part of the specification, wherein detailed description is for the purpose of fully disclosing the invention without placing limitations thereon.

BRIEF DESCRIPTION OF DRAWING FIGURES

DETAILED DESCRIPTION OF THE PREFERRED EMBODIMENTS OF THE INVENTION

Figure 1:
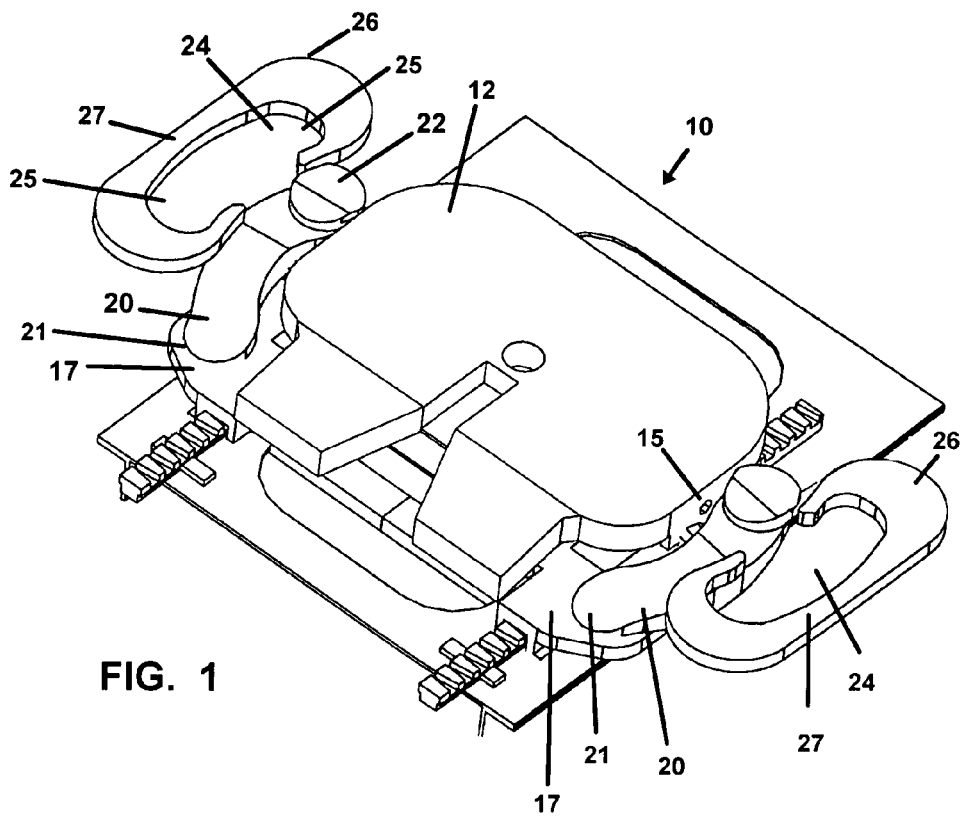
FIG. 1 is a perspective view of a first preferred embodiment of the invention showing the two horizontally rotating catch arms disengaged from a trailer mounted catch plate.

Referring now to the drawings of FIGS. 1–10, FIG. 1 is a perspective view of a first preferred embodiment of the anti-jackknife device 10. In the preferred embodiments herein described a conventional fifth wheel 12 is pivotally attached to a support bracket 14 employing pins 15 which is a well-known configuration of the fifth wheel 12 in tractors used to pull trailers which are adapted to engage upon the fifth wheel 12 during transport. The support bracket 14 is engaged upon a support frame 16 of the underlying tractor or truck and laterally translatable on a geartrain 18 to a plurality of removably fixed positions. This is done to adjust the position of the fifth wheel 12 to optimally position the load in the trailer, over the rear wheels of the tractor. However, there are also employed in the trucking industry fifth wheels 12 which are mounted in a permanent position on the tractor and which do not translate. The invention described herein can be used for either a translating or fixed fifth wheel 12 design and such is anticipated.

In a first preferred embodiment of the device 10 of FIG. 1, a pair of catch arms 20 are rotationally engaged at a first end 21. The first ends 21 may be engaged to an arm bracket 17 engaged with the support bracket 14 supporting the fifth wheel 12 or formed as part of the support bracket 14, such that the distal end 22 of the catch arms 20 translate toward and engagement with the catch brackets 26 mounted on the trailer. Of course the arm bracket 17 might also be engaged with the gear train 18 and support frame 16 so long as it translates concurrently when the support bracket 14 is translated on the gear train 18 to maintain its position for engagement with the catch brackets 26 on the trailer. This manner of mounting the first ends 21 imparts any strain on the device 10 to the support frame rather than to the fifth wheel 12 when the device 10 translates the catch arms 20 to restrain the trailer angle.

The rotational engagement of the first end of the catch arm 20 can be accomplished by a number of means of rotational engagement depending on which embodiment is being employed. If the rotation is vertical as in the device 11 shown in FIGS. 3–4, a pin or notched engagement of the first end to its mount will work well. If the rotation of the catch arms 20 is horizontal as in FIGS. 1–2, then an axle and bearing engagement of the first ends 21 allow for the horizontal translation of the distal ends 22 when the catch arms 20 rotate to engage the catch brackets. If the rotation is intended to cause an angled incline of the distal ends 22 as in FIGS. 8–9, then the axle and bearing engagement at the first ends 21 will be slightly angled in relation to the plane of the support frame 16 to allow for an angled incline of the distal ends 22. This is accomplished in the depicted embodiment by angling the arm bracket 17.

Figure 2:
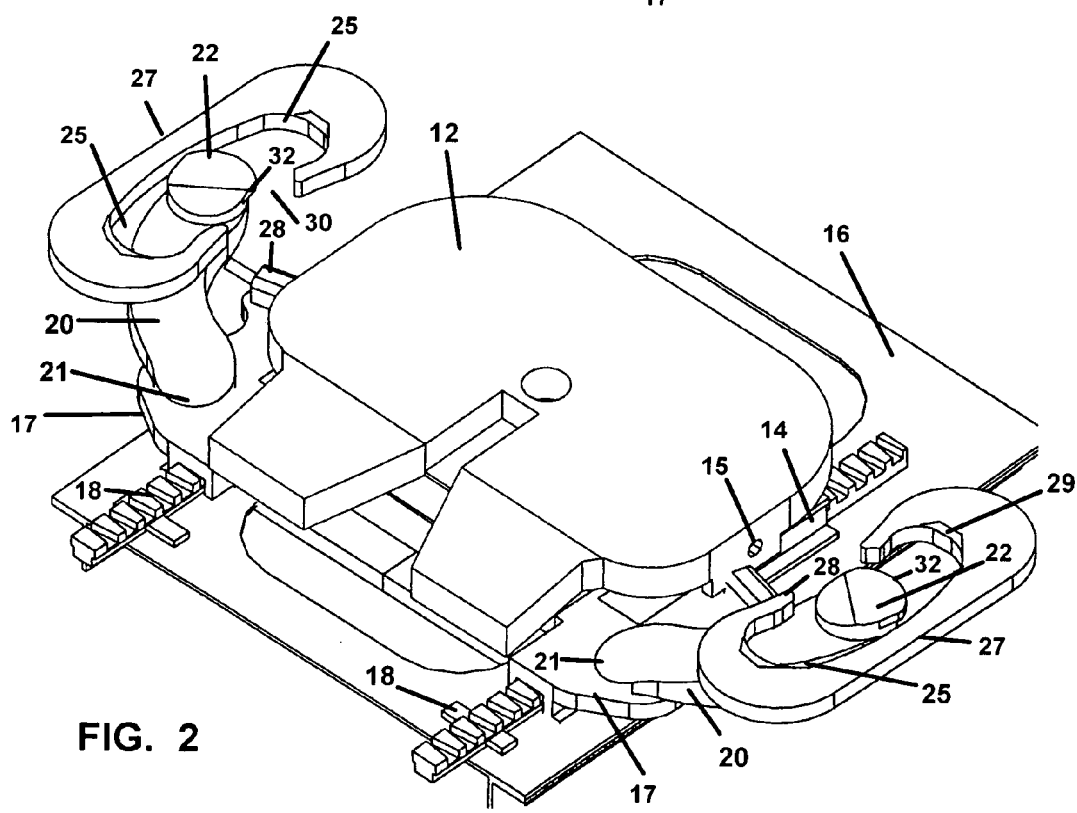
FIG. 2 shows a perspective view of the first preferred embodiment of FIG. 1 with the catch arms engaged within a cavity defined in the catch plate.

All embodiments of the device shown operate in a similar manner with the catch arms 20 rotating from their respective mounts to engage a pair of trailer-mounted catch brackets 26. In the first favored embodiment of FIGS. 1–2 the distal ends 22 of the catch arms 20 have a retracted position as shown in FIG. 1 adjacent to the fifth wheel 12 and disengaged from apertures 24 formed in catch brackets 26. The distal ends 22 have an engaged position as best shown in FIG. 2 wherein the arms translate to a position furthest away from the fifth wheel 12 and substantially centered between the two formed ledges 25 catch brackets 26. The catch brackets 26 are depicted as a one piece unit in the drawings because the center section 27 between the two ends provides more strength to the catch bracket 26. However, two independent catch brackets could be used without the center section 27 so long as a front and rear ledge 25 is provided on each side of the trailer to provide a front and rear engagement point for the distal end 22 of the catch arm 20.

Movement between the retracted position and the engaged position with the distal ends 22 of the catch arms 20 substantially centered between the front and rear engagement points 25 is accomplished by a means to rotate the catch arm 20 in its attachment at the first end 21, such as a solenoid or hydraulic translating cylinder 28 as shown. However, those skilled in the art will realize that any number of means for rotating the catch arms can be employed and any such means is anticipated by this patent.

The rotation of the catch arms 20 in their engagement with the arm bracket 17 or support frame 16 or other mount at the first end 21 should as a general rule only occur when the tractor rises above a threshold speed and a controller activates the means to rotate the catch arm 20 and position the distal ends 22 to the engaged position in between the ledges 25. Rotating the catch arms 20 thus provides a means to position the distal ends 22 between the disengaged position and engaged position. In the embodiment of the device with horizontal rotation such as that in FIGS. 1–2, the distal ends 22 translate parallel to the plane of the support frame 16 positioning the distal ends 22 in the engaged position between the ledges 25. When moving from the disengaged position to the engaged position, the distal ends 22 of the catch arms 20 communicate through a gap 30 a static position substantially centered between the two ledges 25 on the formed in the catch brackets 26.

The trailer, when engaged with the rotatable fifth wheel 12, will rotate around the center point 34 in the fifth wheel 12. Thus the ledges 25 should be positioned in their mount on the bottom of the trailer to allow an arch shaped path between the front engagement point and rear engagement point. The use of these catch brackets 26 in all of the embodiments of this invention, whether in the one piece embodiment shown or a two-piece component without the center section 27, eliminates the need to cut holes or gaps into the trailer floor and the resulting weakening of the trailer structure. The placement of the catch brackets 26 on the bottom of the trailer is best performed in a manner to register the path of the arc of distal ends 22 in the engaged position in the center arc of the rotating trailer around the center point 34, placing them between the front and rear engagement points provided by the ledges 25.

In a preferred mode of all of the disclosed embodiments, the tip of the distal ends 22 of the catch arms 20 has a slight notch 32 forming an overhang 33 adapted to engaged a recess 29 formed in the ledges 25 on catch brackets 26 forming a space between the ledges 25 and the bottom of the trailer. This engagement of the overhang 33 of the distal end 22 formed by the notch 32 within that space between the trailer and the ledge 25 provides a means to maintain the engagement of the distal ends 22 with the catch brackets 26 during periods of high vectored angular force. When in the engaged position in the various embodiments of the disclosed device, the distal ends 22 of the catch arms 20 are initially located substantially in the center of the path between the front engagement point and rear engagement point provided by the ledges 25. This allows the distal ends 22 to slide in the arc shaped path and to engage with either of the front engagement point or the rear engagement point when the trailer rotation reaches a point of contact between the distal ends 22 and the ledges 25. This engagement provides resistence to jackknifing of the trailer with both of the catch arms 20 engaging ledges 25 on opposite sides of their respective catch brackets 26.

Figure 3:
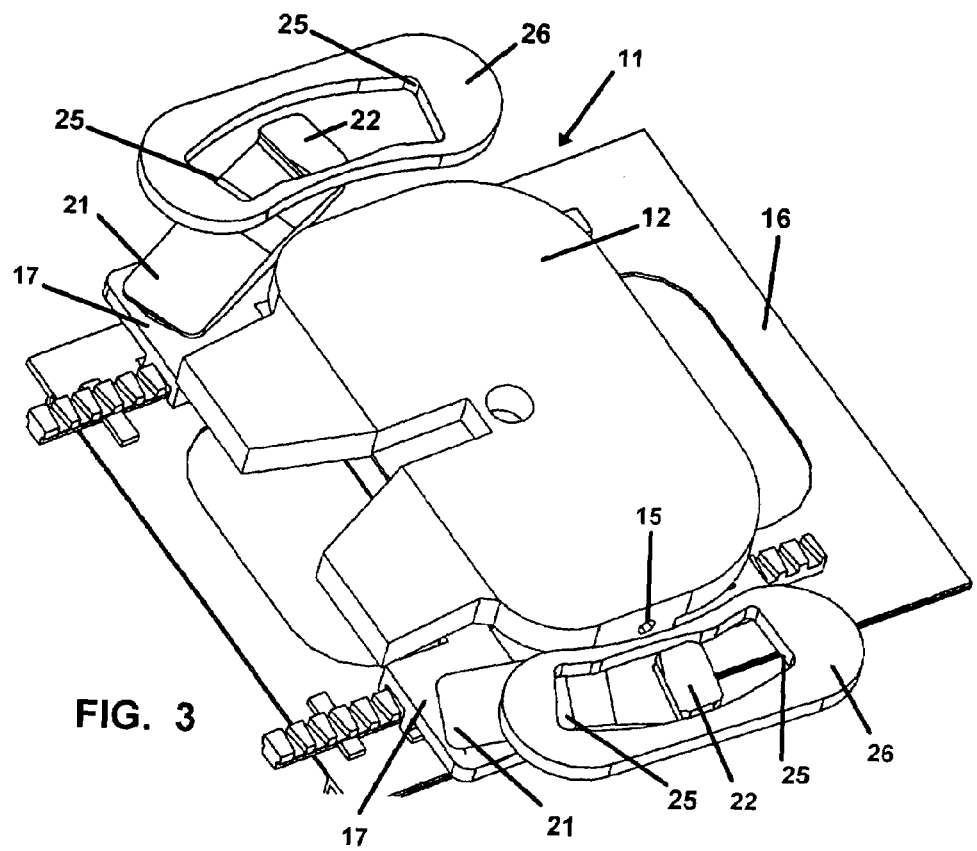
FIG. 3 depicts a perspective view of another favored embodiment of the device employing vertically rotating catch arms which engage within apertures formed in the trailer mounted catch plate.

FIG. 3 depicts a perspective view of another favored embodiment of the device 11 which operates in a fashion similar to the first embodiment of the device 10 in that the catch arms 20 rotate vertically from a disengaged position closest to the support frame 16 to the engaged position with the distal ends 22 of the catch arms 20 positioned substantially between the two ledges 25 of the respective catch brackets 26 which are mounted overhead on adjacent to the floor of the trailer. While the brackets 26 are depicted as having two center sections 27 which provide increased strength, they could be formed without center sections 27 between the front and rear portions providing the ledges 25. The center sections 27 as noted above provide more strength to the catch bracket 26.

Figure 4:
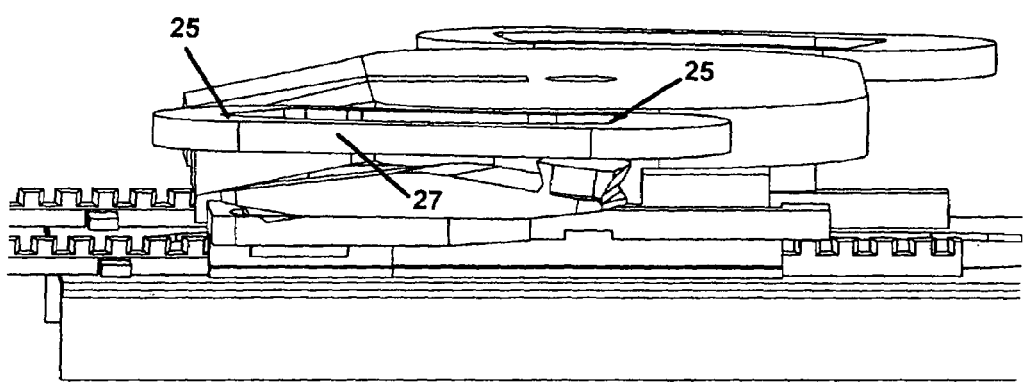
FIG. 4 is a side view of the embodiment of FIG. 3 showing the catch arms in a disengaged position from the catch plates.
Figure 5:
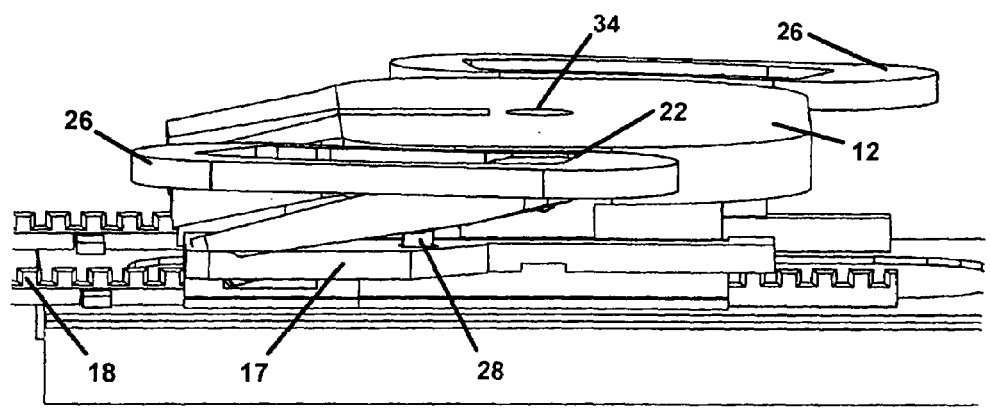
FIG. 5 is a side view of the embodiment of FIG. 3 showing the catch arms in an engaged position with their distal ends engaged within an aperture in the catch plates.

This embodiment of the device employs vertically rotating catch arms 20 which engage in between the ledges 25 of the catch brackets 26 substantially centered therebetween. As shown in FIG. 4, in the disengaged position used at slow speeds, the distal ends 22 are lowered below the bottom surface of the catch bracket 26 and out of any engagement of the distal ends 22 with the ledges 25 in the catch brackets 26, thereby allowing uninhibited rotation of the trailer around the center point 34. When the speed of the truck increases past the threshold speed in the same fashion as the first embodiment of the device 10 and as shown in FIG. 5, the distal ends 22 of the catch arms 20 rise to the engaged position with their distal ends 22 positioned in between the two ledges 25. As in the first embodiment, movement of the catch arms 20 to move the distal ends 22 between the retracted position and the engaged position is accomplished by a means to rotate the catch arms 20 such as a solenoid or hydraulic translating cylinder 28 as shown. However, those skilled in the art will realize that any number of means for rotating the catch arms 20 vertically can be employed and as such are anticipated by this patent.

Figure 6:
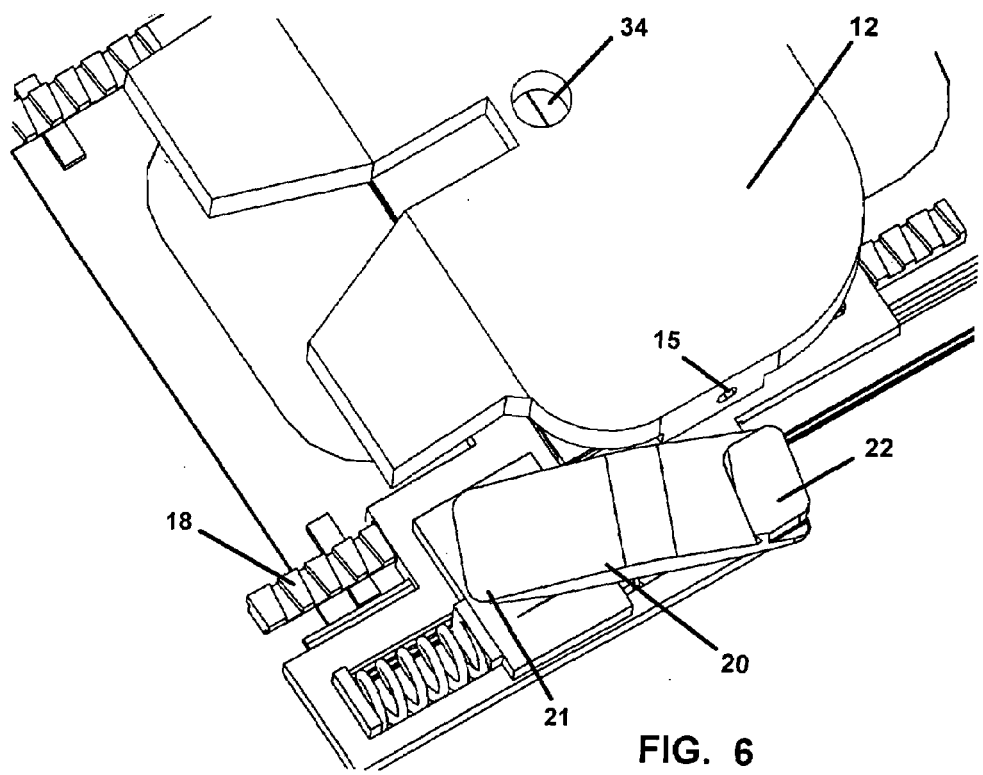
FIG. 6 depicts a biasing mechanism that can be used with either embodiment of the device and employed to dampen the force imparted to the tractor from the trailer.
Figure 7:
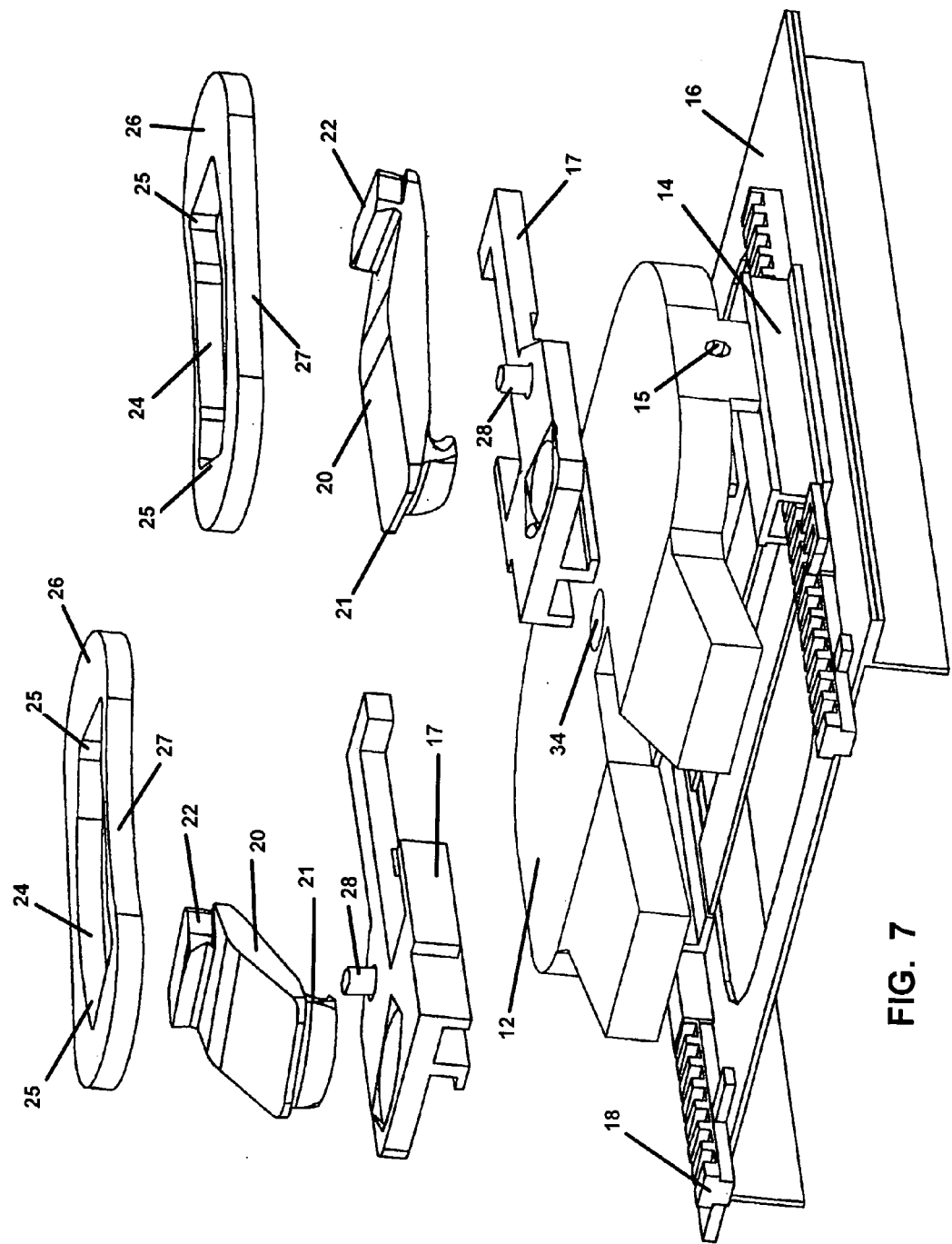
FIG. 7 depicts an exploded view of the device of FIG. 3.

An optional shock absorption means to dampen movement of the distal ends of the catch arms 20 and to help reduce the force imparted to the arm bracket 17 which is transmitted to the truck through the support frame 16 is shown in FIG. 6. This depicted shock absorbing means employs a hydraulic shock absorber 36 commonly available for vehicles that would engage a sliding version of the arm bracket 17. As force from the moving trailer is imparted to the distal ends 22 by their engagement with the ledges 25 of the trailer-attached catch brackets 26 in either direction, it slides the arm bracket 17, forcing the shock absorber 36 to translate and dissipate through work, energy that would otherwise be communicated to the tractor frame. Additional shock absorption can be provided by the employment of a biasing means such as spring 38 to concurrently resist the translation of the arm bracket 17. This shock absorption means can be used with any of the disclosed embodiments to dampen the force imparted to tractor frame from the trailer through the catch arms.

Figure 8:
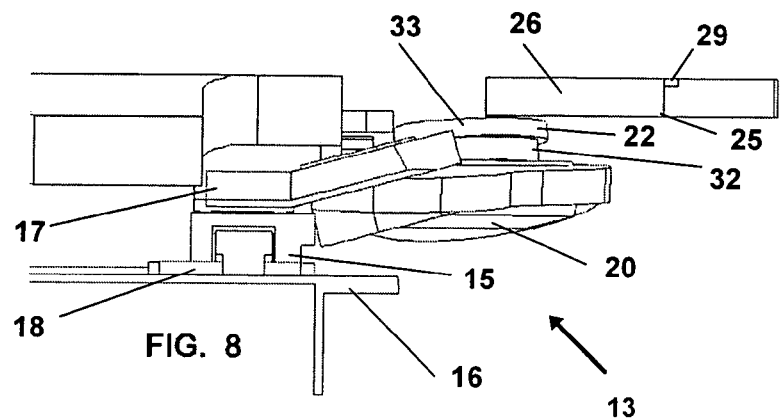
FIG. 8 is an end view of another preferred embodiment of the device showing the catch arms in a retracted position with an angled rotational engagement at the first end.

FIG. 8 is an end view of another preferred embodiment of the device 13 showing the catch arms in the retracted position. This embodiment employs an angled rotational engagement at the first end 21 to the arm bracket 17 engaged with the support bracket 14 supporting the fifth wheel. As with the other embodiments, the arm bracket 17 may be formed as part of the support bracket 14 or in any other manner which will provide a mount to first end 21 of the catch arm 20 which imparts any force developed thereon to the tractor frame and not to the fifth wheel 12.

Figure 9:
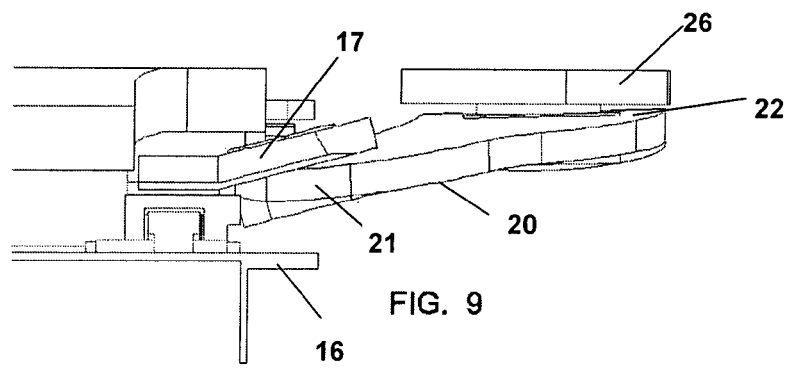
FIG. 9 depicts the embodiment of the catch arms of FIG. 8 wherein the distal ends of the catch arms translate to the engaged position in an angled or inclined plane of travel.

In this embodiment of the device 13, the distal ends 22 of the catch arms 20 translate to the engaged position as shown in FIG. 9 in an angled or inclined plane of travel in relation to the plane of the support frame 16. The distal ends 22 move to the same engaged position substantially centered between the two ledges 25 formed on the catch brackets 26 as the other embodiments.

Translation of the catch arms 20 and the distal ends 22 between the retracted position and the engaged position using the horizontal, vertical, or inclined travel path would be the choice of the end user based on design considerations since any of the three paths of travel provide the engagement between the distal ends and the ledges 25 above the threshold speed when the trailer reaches an angle to cause that engagement.

Figure 10:
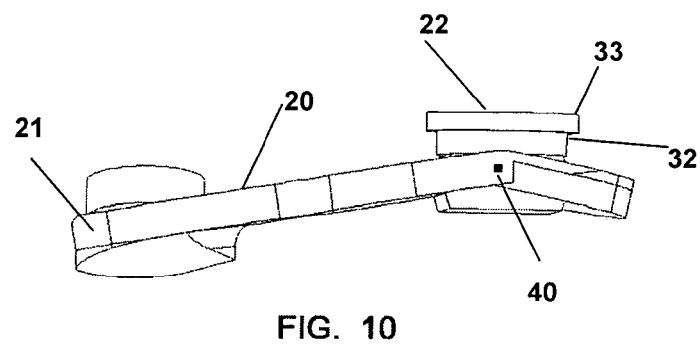
FIG. 10 depicts the distal end of the catch arm in another preferred embodiment which pivots.

Finally, shown in FIG. 10 is an optional mounting of distal end 22 of the catch arm 20 which is engaged in a means of pivotal attachment to the catch arm 22 employing a pivot pin 40. The notch 32 is also shown. Using this means for pivotal engagement allows the distal end 22 to rotate and maintain the same plane as the bottom of the trailer to which the catch brackets 26 with the notch engaging ledges 25 are attached. While shown at the distal end of the catch arms 20 which rotate in an incline, the pivoting mount of the distal ends 22 can be used with any of the catch arms 20 herein disclosed and described and such is anticipated. This is of course preferable as a means to keep the distal ends 22 and when employed the overhangs 33 formed by the notches 32 aligned with the movement of the trailer. This helps maximize the engagement of the distal ends 22 with the catch brackets 26 by keeping the angles of the overhang 33 formed by the notch 32 registered to the side of the ledge 25 when the trailer angles in its mount to the fifth wheel 12 over uneven roads. When the recesses 29 are formed in the ledge 25, this pivoted engagement also keeps the overhang 33 lined up with the space between the recess 29 and the bottom of the trailer when such an engagement is employed.

The controller in all embodiments of the disclosed device 10 would best be automatic and act to engage the device 10 once the vehicle exceeds a predetermined threshold speed based on various vehicle characteristics, the load, and handling of the vehicle. Such a control means would activate and cause the distal ends 22 of the catch arms 20 to move to the engaged position automatically once the speed is reached and to disengage once the vehicle drops below the determined threshold speed. This can be done using a computing device communicating with a GPS device or with the speedometer or some other means to determine road speed and communicate that speed to the computer. Alternatively, a simple manual engagement system could be provided with our without the automatic controller to allow for the driver to push a button to activate the system and deploy or retract the catch arms 20.

While all of the fundamental characteristics and features of the invention have been shown and described herein, with reference to particular embodiments thereof, a latitude of modification, various changes and substitutions are intended in the foregoing disclosure, and it will be apparent that in some instance some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An anti-jackknifing apparatus adapted for engagement between a tractor engaged with a trailer, comprising:
   a pair of catch arms having a first end and a distal end;
   means for rotational attachment of said first end of each of said pair of catch arms to a mounting position on said tractor;
   a forward engaging component adapted to engage with each said distal end of each respective catch arm, and a rearward engaging component adapted to engage with each said distal end of each respective catch arm, said forward engaging component and said rearward engaging component positioned on a bottom surface of said trailer;
   said distal ends having an engaged position and having a retracted position;
   means to rotate said pair of catch arms to thereby move said respective distal ends between said retracted position and said engaged position;
   said distal ends in said engaged position located in an arced horizontal path between said forward engaging component and said rearward engaging component, said horizontal path being substantially parallel to the bottom of said trailer;
   said distal ends in said retracted position located out of said horizontal path;
   control means to activate said means to rotate said pair of catch arms to move said distal ends to said engaged position; and
   whereby said distal ends in said engaged position will engage with one of said forward engaging component or said rearward engaging component when said trailer rotates in its engagement with said tractor past a predetermined angle.

2. The anti-jackknifing apparatus of claim 1 wherein said means for rotational attachment of said first end of each of said pair of catch arms comprises:
   said catch arms rotating substantially vertically in relation to said horizontal path; and
   said distal ends translating substantially vertically between said retracted position and said engaged position.

3. The anti-jackknifing apparatus of claim 2 additionally comprising said forward engaging component adapted to engage with each said distal end of each respective catch arm and said rearward engaging component adapted to engage with each said distal end of each respective catch arm by employing a means for cooperative engagement of said distal end to said forward engaging and rearward engaging components;
   said means for cooperative engagement comprising:
   a projection on one of said distal ends, or, said forward engaging component and said rearward engaging component;
   a recess sized to engage said projection; and
   said recess situated on said distal ends or said forward engaging component and said rearward engaging component, opposite said projection.

4. The anti-jackknifing apparatus of claim 3 additionally comprising:
   said distal ends pivotally engaged to said catch arms.

5. The anti-jackknifing apparatus of claim 2 additionally comprising:
   said mounting position of said catch arms having a translatable engagement to said tractor whereby said catch arms may be translated along the center axis of said tractor, said center axis being perpendicular to a rear axle of said tractor.

6. The anti-jackknifing apparatus of claim 1 wherein said means for rotational attachment of said first end of each of said pair of catch arms comprises:
   said catch arms rotating substantially horizontally and parallel to said horizontal path; and
   said distal ends translating substantially horizontally between said retracted position and said engaged position.

7. The anti-jackknifing apparatus of claim 6 additionally comprising said forward engaging component adapted to engage with each said distal end of each respective catch arm and said rearward engaging component adapted to engage with each said distal end of each respective catch arm by employing a means for cooperative engagement of said distal end to said forward engaging and rearward engaging components;
   said means for cooperative engagement comprising:
   a projection on one of said distal ends, or, said forward engaging component and said rearward engaging component;
   a recess sized to engage said projection; and
   said recess situated on said distal ends or said forward engaging component and said rearward engaging component, opposite said projection.

8. The anti-jackknifing apparatus of claim 7 additionally comprising:
   said distal ends pivotally engaged to said catch arms.

9. The anti-jackknifing apparatus of claim 6 additionally comprising:
   said mounting position of said catch arms having a translatable engagement to said tractor whereby said catch arms may be translated along the center axis of said tractor, said center axis being perpendicular to a rear axle of said tractor.

10. The anti-jackknifing apparatus of claim 1 wherein said means for rotational attachment of said first end of each of said pair of catch arms comprises:
    said catch arms rotating substantially in an angled plane in relation to said horizontal path; and
    said distal ends translating in said angled plane between said retracted position and said engaged position.

11. The anti-jackknifing apparatus of claim 10 additionally comprising said forward engaging component adapted to engage with each said distal end of each respective catch arm and said rearward engaging component adapted to engage with each said distal end of each respective catch arm by employing a means for cooperative engagement of said distal end to said forward engaging and rearward engaging components;
    said means for cooperative engagement comprising:
    a projection on one of said distal ends, or, said forward engaging component and said rearward engaging component;
    a recess sized to engage said projection; and
    said recess situated on said distal ends or said forward engaging component and said rearward engaging component, opposite said projection.

12. The anti-jackknifing apparatus of claim 11 additionally comprising:
said distal ends pivotally engaged to said catch arms.

13. The anti-jackknifing apparatus of claim 10 additionally comprising:
said mounting position of said catch arms having a translatable engagement to said tractor whereby said catch arms may be translated along the center axis of said tractor, said center axis being perpendicular to a rear axle of said tractor.

14. The anti-jackknifing apparatus of claim 1 additionally comprising said forward engaging component adapted to engage with each said distal end of each respective catch arm and said rearward engaging component adapted to engage with each said distal end of each respective catch arm by employing a means for cooperative engagement of said distal end to said forward engaging and rearward engaging components;
said means for cooperative engagement comprising:
a projection on one of said distal ends, or, said forward engaging component and said rearward engaging component;
a recess sized to engage said projection; and
said recess situated on said distal ends or said forward engaging component and said rearward engaging component, opposite said projection.

15. The anti-jackknifing apparatus of claim 14 additionally comprising:
said distal ends pivotally engaged to said catch arms.

16. The anti-jackknifing apparatus of claim 15 additionally comprising:
said mounting position of said catch arms having a translatable engagement to said tractor whereby said catch arms may be translated along the center axis of said tractor, said center axis being perpendicular to a rear axle of said tractor.

17. The anti-jackknifing apparatus of claim 14 additionally comprising:
said mounting position of said catch arms having a translatable engagement to said tractor whereby said catch arms may be translated along the center axis of said tractor, said center axis being perpendicular to a rear axle of said tractor.

18. The anti-jackknifing apparatus of claim 1 additionally comprising:
said distal ends pivotally engaged to said catch arms.

19. The anti-jackknifing apparatus of claim 18 additionally comprising:
said mounting position of said catch arms having a translatable engagement to said tractor whereby said catch arms may be translated along the center axis of said tractor, said center axis being perpendicular to a rear axle of said tractor.

20. The anti-jackknifing apparatus of claim 1 additionally comprising:
said mounting position of said catch arms having a translatable engagement to said tractor whereby said catch arms may be translated along the center axis of said tractor, said center axis being perpendicular to a rear axle of said tractor.

21. The anti-jackknifing apparatus of claim 1 additionally comprising:
means to dampen the force imparted to the tractor through said catch arms from their engagement with the trailer.

22. The anti-jackknifing apparatus of claim 1 additionally comprising:
said control means being automatic and activating said means to rotate said pair of catch arms to move said distal ends to said engaged position once the vehicle exceeds a threshold speed.

23. The anti-jackknifing apparatus of claim 22 additionally comprising:
said control means additionally being manually activateable to activate said means to rotate said pair of catch arms to move said distal ends to said engaged position.

24. The anti-jackknifing apparatus of claim 1 additionally comprising:
said control means being manually activated to activate said means to rotate said pair of catch arms to move said distal ends to said engaged position.

* * * * *